Figure 1:
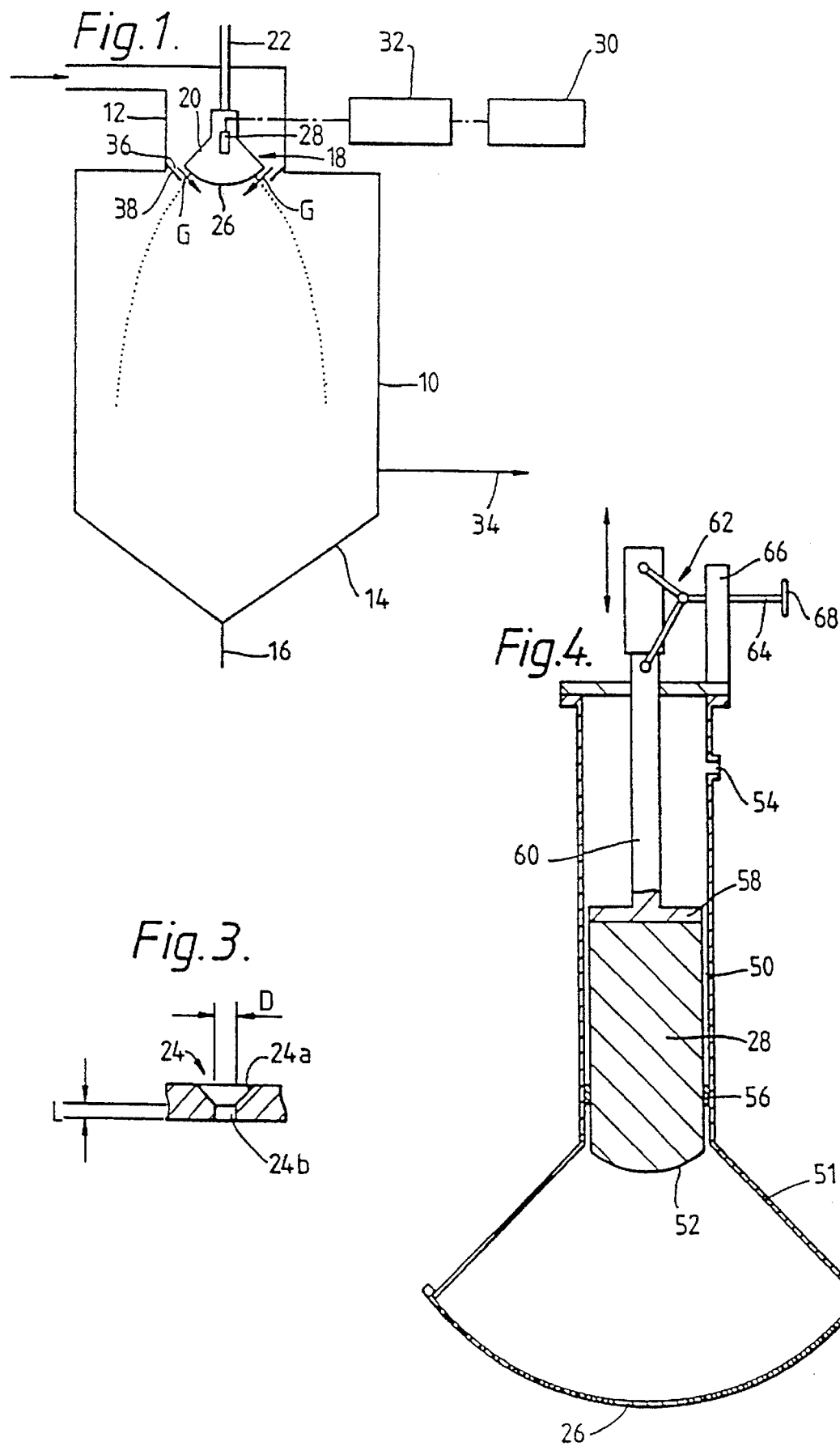
Figure 2:
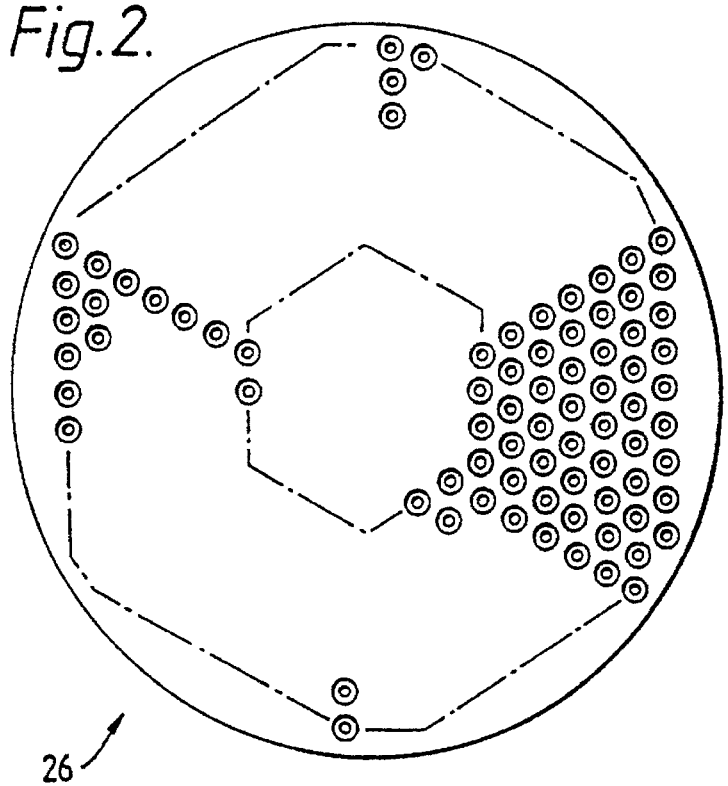

United States Patent [19]
Oliver et al.

[11] Patent Number: 5,628,937
[45] Date of Patent: May 13, 1997

[54] PRODUCTION OF PARTICULATE MATERIALS

[75] Inventors: Raymond Oliver; Anthony R. N. Fairclough, both of Cleveland; Alejandro M. Antonini, Lancashire; Robert J. Munro, Cleveland; Lynn W. Lipscombe, Hampshire, all of United Kingdom

[73] Assignee: Imperial Chemical Industries PLC, United Kingdom

[21] Appl. No.: 454,234

[22] PCT Filed: Dec. 15, 1993

[86] PCT No.: PCT/GB93/02554

§ 371 Date: Aug. 10, 1995

§ 102(e) Date: Aug. 10, 1995

[87] PCT Pub. No.: WO94/20204

PCT Pub. Date: Sep. 15, 1994

[30] Foreign Application Priority Data

Dec. 18, 1992 [GB] United Kingdom ............ 9226474

[51] Int. Cl.$^6$ ............... B29B 9/10; B01D 1/18; B01D 1/20
[52] U.S. Cl. ............... 264/9; 264/14; 425/6; 425/10; 159/4.4; 159/48.1
[58] Field of Search ............ 264/9, 14; 425/6, 425/10; 159/4.01, 4.4, 48.1

[56] References Cited

U.S. PATENT DOCUMENTS 4,218,411  8/1980  Price et al. .
4,296,208 10/1981  Gagliani et al. .
4,585,165  4/1986  Kholin .
4,689,515  8/1987  Benndorf et al. .
5,064,501 11/1991  Boersen ........................ 159/4.08
5,227,017  7/1993  Tanaka et al. ................. 159/4.01

FOREIGN PATENT DOCUMENTS 86704      5/1986  European Pat. Off. .
0233384    8/1987  European Pat. Off. .
568936A1  11/1993  European Pat. Off. .
5179006    7/1993  Japan .
5212263    8/1993  Japan .
1454597   11/1976  United Kingdom .
1592819    7/1977  United Kingdom .

OTHER PUBLICATIONS

Environmental Science & Technology, vol. 7, No. 2, pp. 146–153 Feb. 1973 Berglund and Liu.

Transactions of the ASAE, pp. 618–622 Feb. 1975 L. F. Bouse.

Ind. Eng. Chem. Res. vol. 31, No. 3, pp. 959–967 Feb. 1992 Paul A. Haas.

Primary Examiner—Mary Lynn Theisen

[57] ABSTRACT

A process for producing solid particles by drying a spray of liquid droplets. The droplets are formed by projecting a liquid formulation as a plurality of jets J (FIG. 6) in such a way that each jet breaks up into droplets of narrow size distribution. Prior to the onset of coalescence the droplets are contacted with a gas flow (G) which is arranged to reduce coalescence by disrupting slip streaming of the droplets and/or accelerating the droplets.

22 Claims, 3 Drawing Sheets

PRODUCTION OF PARTICULATE MATERIALS

This invention relates to the production of solid particles by a process involving atomisation of a liquid formulation and at least partial change of phase of the liquid droplets while in flight.

It is desirable for a number of industrial and other (eg. pharmaceutical) applications to produce particulate materials with a narrow size distribution range.

Spray dryers for the industrial scale production of solid particulate materials from liquid formulations are well known and typically comprise a tower into which the liquid formulation is sprayed by an atomiser with hot gas being introduced into the tower for contact with the spray. Various forms of atomiser are in common use, such as two-fluid pneumatic nozzles for small drops, single-fluid nozzles and high speed rotary disc atomisers.

However, existing industrial scale spray dryers do not readily lend themselves to applications in which the size of the particles can be accurately controlled, particularly in applications requiring narrow size distributions with an SMD (Sauter Mean Diameter) less than 1 mm, and especially less than 500 microns. Also, existing industrial scale spray dryers tend to produce substantial quantities of fines which are entrained by, and have to be subsequently separated from, the gas used to effect drying. Separation equipment for the purpose of gas clean-up constitutes a significant capital cost in building a spray drier plant. There is consequently a need for apparatus and a process capable of producing closely controlled particle sizes with minimal fines production.

It is known from Berglund and Liu (Environmental Science & Technology, Vol 7, No. 2, February 1973, Pages 146–153) to generate aerosols comprising closely monodisperse particle sizes. Droplets are formed from a single liquid jet by feeding liquid under pressure through a single orifice in a disc and mechanically disturbing the disc at a constant frequency by means of an electrically driven piezoelectrical ceramic so that the jet breaks up into uniform droplets. The droplets so formed are then passed through a further orifice together with a turbulent air jet which serves to disperse the stream of droplets into a conical shape. The resulting aerosol is diluted and transported by an air flow passing through a vertical plastic tube and the air may also serve to dry the droplets when the latter comprise a non-volatile solute in a volatile solvent by evaporating the solvent. The aerosol generator disclosed in the Berglund and Liu reference is intended to produce monodisperse aerosols for use in aerosol research, calibration of aerosol sampling and measurement instruments, testing particulate control devices such as cyclones, filters and scrubbers, and for studying the effects of particulate air pollutants.

The use of a sonic device to induce cyclic disturbances on the surfaces of liquid jets formed by a multiple orifice nozzle for the production of a monodisperse spray is disclosed in an article by L F Bouse in Transactions of the ASAE—1975, Pages 618–622.

GB-A-1454597 discloses a method of prilling a liquid in which a liquid is passed under pressure through a flat perforated plate and is subjected to periodic pressure fluctuations in the direction of flow. The perforations are shown as being oriented at different angles relative to one another for reasons that are not disclosed. The resulting liquid droplets solidify to form grains having average diameters of the order of 1200 microns or greater.

EP-A-86704 discloses a process for the production of perfectly spherical and porous granules by dispensing from a plurality of needles liquid droplets which fall on to a moving bed of powdered material, the droplet size and shape being controlled by producing a laminar air flow concentric with each droplet-forming needle so that the droplets emitted individually from each needle is skimmed by the laminar air flow.

The present invention seeks to provide an improved process for the production of solid particles with a controlled narrow size distribution, particularly industrial scale production of solid particles with narrow particle size ranges with a Sauter Mean Diameter substantially less than 1 mm, eg no greater than 800 micron and, in some instances, less than 500 micron.

According to the present invention there is provided a process for the production of solid particles, comprising:

projecting from a body of liquid an array of mutually divergent jets; disturbing the jets to cause break up thereof into streams of droplets of narrow size distribution;

contacting the array of resulting droplet streams with a gas flow to reduce coalescence of the droplets in each stream; and causing or allowing the droplets to solidify at least partially while in flight.

Preferably the gas flow is turbulent and is contacted with the droplet streams so as impart variable displacement forces to the droplets laterally of the direction of jet projection. Alternatively or additionally, the gas flow may be arranged to impart an acceleration to the droplets in the general direction of travel of the array of jets.

We have established that, whilst it is possible to produce relatively large droplets (typically with a mean diameter of 2000 microns) with a narrow droplet size distribution by controlling break up of the liquid jets, when substantially smaller droplets (for example, less than about 500 microns) are required the spread of droplet sizes increases significantly. We have found that this is attributable to the fact that, whilst small droplets can be initially produced with a narrow size range by techniques involving controlled disturbance of liquid jets, subsequent coalescence of droplets derived from each jet takes place which affects the initial narrow size distribution significantly. Such coalescence tends to take place when the droplet size is such that successive droplets in the stream tend to close up and coalesce due to a reduction in drag force on droplets in streams (ie. slip streaming).

The gas flow is employed in the process of the invention to reduce such coalescence thereby allowing the initial narrow droplet size distribution to be substantially maintained. As indicated above, coalescence can be reduced by disrupting the droplet streams by means of a turbulent gas flow and/or accelerating the droplets in each stream to overcome drag force-induced coalescence.

According to a second aspect of the present invention there is provided apparatus for producing solid particles, comprising:

means for discharging liquid formulation from a body of the liquid as an array of jets;

means for disturbing the jets to cause break up thereof into an array of droplet streams comprising droplets having a narrow size distribution;

means for contacting the droplet streams with a gas flow so that, prior to the onset of coalescence, the droplets in each stream are dispersed to reduce coalescence thereof; and means for effecting at least partial solidification of the droplets while in flight.

Preferably the contact between the gas flow and the liquid jets or droplet streams is such that the droplets in each stream are subjected to variable displacement forces laterally of the direction of jet projection and/or to an acceleration in the general direction of travel of the array of jets.

Usually the magnitude of the gas flow velocity exceeds the magnitude of the velocity at which the jets are projected. Preferably the gas flow velocity has a magnitude which is at least twice that of the jets.

The liquid formulation will of course be one which is capable of undergoing at least partial solidification while the droplets are in flight.

Preferably solidification of the droplets is effected by interaction with the gas. The nature of the interaction may take different forms; for example, in some instances, it may involve transfer of heat between the droplets and the gas (the flow-of heat being either from the gas to the droplets or vice versa), or it may involve a chemical reaction between the gas and the liquid formulation. For instance, whilst in flight the droplets may be subjected to irradiation which, in the case of a suitable liquid formulation, may initiate or assist a chemical reaction between constituents of the liquid formulation.

In some cases, the gas may play a substantially passive role in the solidification process: for instance, the liquid formulation may be such that the droplets undergo solidification in flight without assistance from the gas. The liquid formulation may be one which undergoes solidification upon exposure to radiation, such as UV, IR, microwave or visible radiation. In this event, the process of the invention may comprise exposing the droplets to radiation while in flight.

The extent to which solidification needs to take place in flight will depend upon the nature of the liquid formulation. Solidification in some instances need only be partial if the partly solidified particles do not tend to adhere to one another when deposited on a collection surface. In this event, completion of solidification may take place when the particles are no longer in flight.

Although the droplets following partial or complete solidification thereof in flight may be maintained separated from one another by the gas flow until they deposit on a collection surface, it will be appreciated that the need to maintain droplet separation applies only while the droplets are in a state in which coalescence is possible. Thus, the gas flow need only be effective for maintaining droplet separation over that part of the droplet trajectories where coalescence may occur.

In accordance with a preferred aspect of the present invention the jets are formed by projecting a liquid formulation as a plurality of mutually divergent jets from a body of said liquid formulation and applying pressure pulses to said body of liquid formulation so that the jets are simultaneously subjected to said pressure pulses and are thereby caused to break up into droplets of narrow size distribution.

For example, the jets may be subjected to perturbations induced by acoustic pressure pulses resulting in jet break-up into substantially monosize droplets.

The pressure pulses are advantageously produced by an acoustic transducer, for example a piezo-electric transducer or magneto-strictive device immersed within or in contact with the body of said liquid formulation.

The pressure pulsing means will usually be arranged to produce pulses having a predetermined amplitude and frequency suitable for achieving desired droplet sizes and conveniently is capable of producing a selectively-variable amplitude and/or frequency output so that these parameters may be varied in accordance with the nature of the liquid formulation and the desired droplet sizes. The amplitudes and frequencies my be determined empirically for a given liquid formulation and usually fall within the range 0.5 to 5 microns and 1 to 300 kHz respectively- Preferably the pulse frequency is that at which the jets resonate.

Usually the liquid formulation is projected as a multiplicity of mutually-divergent jets between a pair of imaginary conical surfaces.

Preferably the jets are projected from an array of orifices formed in a curvilinear outwardly convex surface such that the curvature of the surface determines the trajectories of the jets, the curvilinear surface advantageously being generally part-spherical such that each jet is non-parallel with, and divergent with respect to, the remaining jets.

The pulsing means is preferably so designed as to produce a pressure wave having a wavefront which substantially conforms to the shape of the surface in which the orifices are formed so that substantially the same energy is imparted to each orifice site. For instance, if the orifices are formed in a plate or the like of part-spherical configuration, the pulsing means is preferably designed to produce pressure pulses having a generally spherical wavefront with an (imaginary) origin substantially coinciding with the centre of curvature of the part-spherical plate.

Typically the jets, and hence the droplet streams derived therefrom, are projected vertically downwards with trajectories inclined to the vertical.

In a presently preferred embodiment, the orifices are formed in a dished plate of part-spherical configuration at a location in the region of the periphery of the plate and are arranged to impart to the respective jets a component of motion directed toward the peripheral edge of the plate, the plate forming part of a vessel to which said liquid formulation is supplied under pressure so that the liquid is forced through the orifices. The plate is preferably oriented so that the jets are discharged generally downwardly and the gas for contacting the droplets is caused to flow radially inwardly past the outer peripheral edge of the plate to effect the required entrainment.

Although in preferred embodiments of the invention, the gas is directed radially inwardly relative to the array of jets, we do not exclude the possibility of discharging the liquid as an annular array of jets and contacting them with a gas flow which is directed radially outwards from a location within the annular array in order to prevent or reduce droplet coalescence.

In a modified arrangement in which pressure pulses are applied directly to the liquid, the disturbance applied to the array of jets issuing from the orifices may be generated by producing an acoustic standing wave within the liquid, such that the amplitude of the standing wave varies in a plane generally parallel to the plate in which the orifices are formed.

Instead of applying pressure pulses directly to the body of liquid, the disturbances applied to the jets may be generated by physically vibrating the plate in which the array of orifices are formed. For instance, the plate may be vibrated by means of a resonant piezoelectric driver system. However, such an arrangement is not preferred since energy is expended in vibrating the plate itself.

Typically, the number of orifices will range from 200 upwards, eg. from 2000 to 3000. The orifice diameters in practice depend on the mean particle size desired; for instance, the orifices may range from 10 to 500 microns in diameter.

Desirably the break up of the jets into liquid is by way of laminar jet break up. Typical jet velocities for the liquid formulation as it discharges from the orifices range from 3 to 20 m sec$^{-1}$ and the jet Reynold's number my range from 10 to 10,000.

The gas flow is preferably of a turbulent nature so that the droplets are subject to lateral displacement thereby tending to prevent or reduce slip streaming in addition to accelerating the droplets relative to one another. The gas flow typically has a Reynolds number within the range $1\times10^4$ and $1\times10^6$.

The velocity of the gas flow used to contact the droplets will depend on the jet velocities employed and is usually of the order of to 30 m $sec^{-1}$ giving gas Reynold's numbers of $10^5$ to $10^6$. Where the entrainment gas is used to effect or assist solidification of the droplets, its temperature may typically range from −80° C. to 500° C. depending on whether the gas is to function as a heat donor or a heat receiver in the solidification mechanism, eg. freezing or evaporation.

The trajectories of the jets are conveniently so arranged that the jets enter the gas flow stream either before beginning to break up into droplets or, if subsequent to break-up, before any significant coalescence of droplets can take place.

The invention will now be described byway of example only with reference to the accompanying drawings in which:

FIG. 1 is a schematic view of apparatus in accordance with the invention for the production of particles;

FIG. 2 is a diagrammatic underside plan view of the orifice plate of the jet-producing of the apparatus shown in FIG. 1;

FIG. 3 is a part-sectional view showing the form of the orifices in the orifice plate;

FIG. 4 is a diagrammatic view showing an embodiment of the jet-producing apparatus in which adjustability is provided in order to permit the generation of an acoustic standing;

FIG. 4A is a view corresponding to the embodiment of FIG. 4 showing the form of the acoustic standing wave generated thereby within the body of liquid;

FIG. 5 is a diagrammatic view of another embodiment of the jet-producing apparatus in which an acoustic standing wave is produced in the vicinity of a multi-hole plate from which the jets issue;

FIG. 6 is a diagrammatic view of the droplet generator, illustrating the nature of the interaction between the gas stream and the droplet streams; and FIGS. 7A through 7D are graphs showing droplet size distributions at various distances from a single jet orifice, the abscissa being droplet diameter and the ordinate being liquid mass %.

Referring to FIGS. 1 to 3 of the drawings, the apparatus shown comprises a main vessel 10 having a gas inlet 12 at its upper end and formed as a powder collection hopper 14 at its lower end, the hopper section 14 having an outlet 16 through which powder may be withdrawn. In the vicinity of the gas inlet, the vessel 10 houses a jet producing device 18 defining a chamber 20 to which a liquid formulation suitable for powder production is supplied under pressure via an inlet 22. The liquid formulation is expelled from the device 18 through an array of orifices 24 (see FIG. 2) formed in a downwardly presented plate 26 which is so configured that the liquid issues from the orifices as a multiplicity of mutually-divergent jets with radial components of motion directed away from the axis of symmetry of the plate 26 for contact with a turbulent gas flow supplied through the inlet 12. The gas passes through an annular gap 36 surrounding the device 18 and is deflected by inwardly extending baffle 38 so that an inwardly directed gas stream G is formed. The length of the chamber 20 is selected so as to secure laminar liquid flow entry to the orifices.

As illustrated, the plate 26 is of part-spherical configuration and the orifices 24 are located in an annular zone extending around the centre zone of the plate 26 (see FIG. 2), each orifice 24 being formed so that its axis is substantially normal to the plate and is is non-parallel with the remaining orifice axes by virtue of the curvature of the plate 26. In this way, each jet and hence droplet stream issuing from each orifice is divergent with respect to its neighbours and the jets produced are projected downwardly in a halo which may be concentric with the axis of symmetry of the plate 26.

Although the plate 26 is shown as being part-spherical over its entire extent, it is not essential for this to be the case since the orifices are confined to an annular region encircling a central unperforated region of the plate. In the illustrated embodiment, the orifices are arranged on an equidistant triangular pitch (although other arrangements are possible, such as a radial distribution). Thus, in an alternative embodiment (not illustrated), the orifices may be distributed in radially equispaced circular rows coaxial with the axis of symmetry of the plate 26 with the orifices in each row circumferentially equispaced from one another and with the orifices in one row circumferentially staggered from those in adjacent rows but radially aligned with those in rows once removed therefrom. Typically the orifices in each row have a centre to centre spacing of about 4 droplet diameters and adjacent rows are spaced apart by about 6 droplet diameters where the droplet diameter is computed on the basis of the Weber equation (as discussed hereinafter).

As shown in FIG. 3, each orifice 24 is formed as a countersunk hole, the countersunk portion **24*a* being located at the internal face of the plate 26. Other orifice configurations can be used; for instance, counterbored orifices or straight, cylindrical bores without any counterbore or countersink. The cylindrical portion 24*b*** of each orifice preferably has an aspect ratio L/D no greater than 10 to secure laminar jet formation.

The jets issuing from the orifices 24 are subjected to a disturbance in order to effect controlled break up of each jet into substantially monodisperse droplets. In the illustrated embodiment, this is achieved by producing acoustic pressure pulses within the body of liquid occupying the chamber 20 and to this end, the device 18 incorporates an electro-acoustic transducer 28, eg. a piezo-electric transducer. The transducer is energised by a signal transmitter 30 and amplifier 32 to produce acoustic pressure pulses within the body of liquid in such a way that each pulse simultaneously disturbs all of the liquid jets issuing from the plate 26 to substantially the same extent. By appropriate selection of the pulse frequency and amplitude, with regard to properties of the liquid such as its viscosity, density and its Newtonian or non-Newtonian characteristics, the liquid jets can be caused to break up into substantially monodisperse droplets.

The transducer 28 is designed to produce pressure pulses having a wavefront which matches the internal curvature of the plate 26, ie. the pressure pulse wavefront in effect has a virtual origin which substantially coincides with the centre of curvature of the internal surface of the plate 26. In order to produce a suitably shaped pressure pulse wavefront, the transducer may-comprise more than one transducer element oriented with respect to one another so as to collectively produce a combined wavefront of the desired shape.

In one form of the invention, the transducer comprises an ultrasonic transducer that pulses in the range of 5 to 15 kHz and the arrangement is preferably such that an acoustic standing wave is established between the curvature of the transducer and that of the multi-hole array formed in the plate 26. The distance between the transducer and the array is set an even number of quarter wavelengths. The wavelength of the acoustic wave is a function of the liquid acoustic properties and the frequency of operation, as discussed hereinafter. However, whilst it is preferred to establish a standing wave condition, experience has shown that significant deviations from ideal standing wave conditions can be tolerated providing the disturbance produced at the plate 26 is sufficient to cause break up of the jets to generate substantially monodisperse droplets.

Referring to FIG. 4, in this embodiment the transducer 28 is mounted for adjustment within a passage section 50 of the housing of the device 18 so that the transducer face 52 is shaped to conform generally with the curvature of the plate 26 and is substantially concentric with the latter. The liquid is supplied to the interior of the device housing via an inlet 54 and the passage section 50, there being an annular filter arrangement 56 between the transducer body and the passage section 50 for filtering the liquid. The passage section opens into a conically shaped section to the larger diameter end of which the multi-hole plate 26 is connected. The liquid supply arrangement and the hole configuration in the plate 26 is such that laminar jet production is secured.

Figure 4A:
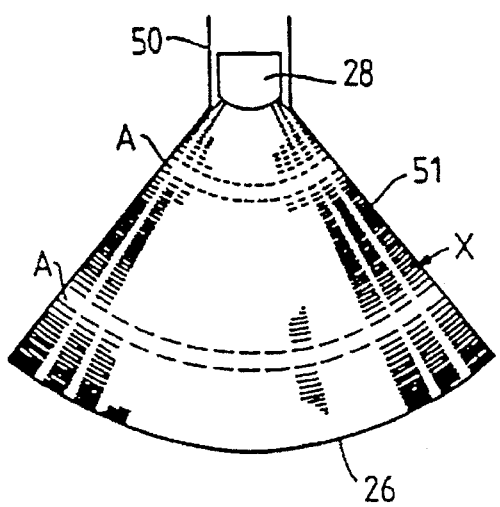

The transducer body is mounted on a disc 58 forming the foot of a rod 60 which is adjustable axially by means of a linkage arrangement 62 actuated by a spindle 64. The spindle is screw-threaded and is received for rotation in a correspondingly threaded bore in support 66 so that rotation of the spindle effected by means of handwheel 68 displaces the spindle in the direction of its axis with consequent upward or downward movement of the rod and the transducer 28. In this way, the transducer can be adjusted to produce an acoustic standing wave. In practice, for a given frequency of operation of the transducer, a standing wave condition can be detected by locating an acoustic sensor such as a probe hydrophone (not shown) immediately adjacent the inner face of the plate 26 and adjusting the transducer until the signal derived sensor indicates a standing wave condition. The amplitude of the standing wave varies in a direction normal to the surface of the plate and is depicted in FIG. 4A by shading X, with the anti-nodes indicated by references A.

Figure 5:
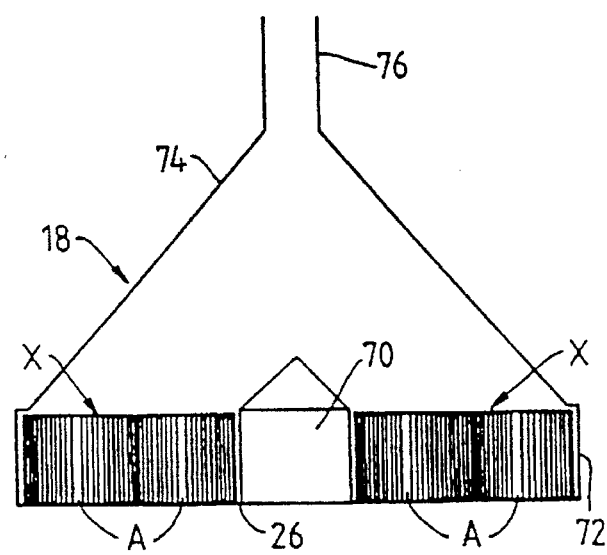

FIG. 5 illustrates an alternative embodiment of jet-producing device which may be used in the embodiment of FIG. 1. In this embodiment, the acoustic standing wave is set up between a transducer 70 having a cylindrical body located centrally of the multi-hole plate 26 and an annular reflector structure 72 which is concentric with the transducer 70 and forms an extension of the conically shaped section 74 of the housing of the device 18. Liquid is supplied to the section 74 via passage section 76. Operation of the transducer 70 at a suitable frequency (or with a suitable radial spacing between the transducer 70 and the reflector 72) allows an acoustic standing wave to be established, the amplitude of which varies in a plane parallel to the plate 26. The form of the standing wave is depicted by shading X, the anti-nodes being at points A. In this embodiment, the plate 26 is shown as being generally planar; however, a curvature may be imparted to it in order to secure jet divergence. Alternatively, the planar plate 26 may have jet producing holes which are drilled at suitable angles to secure an array of mutually diverting jets.

In each of the embodiments of FIGS. 1, 4 and 5, it is preferred to generate the acoustic standing wave in such a way that there are an even number of quarter wavelengths between the active face of the transducer and the plate (in the case of FIGS. 1 and 4) or between the transducer and the reflector (in the case of FIG. 5). In such circumstances, if the reflections take place at surfaces which are perfect reflectors and if there is no significant attenuation in the liquid, the pressure amplitude can be many times greater than the free field value at the nodes, and zero at the anti-nodes. If the spacing is not an even number of quarter wavelengths, the gain in pressure is much less until in the when the spacing is an odd number of quarter-wavelengths, under ideal conditions the pressure at the node is equal to the free field value at the nodes and correspondingly less elsewhere.

In practice, the surfaces at which the acoustic energy undergoes reflection will not be perfect reflectors (for instance, the multi-hole plate will have a complex impedance) and the liquids are likely to have substantial attenuation either intrinsically or by virtue of gas or solids content in the liquid, and consequently the conditions in the jet-producing device will not usually be ideal. Nevertheless, even in a non-ideal case, advantages will usually be obtained with respect to producing effective disturbances to the jets by establishing acoustic standing waves based on an even number of quarter wavelength spacings between the transducer and the opposing reflective surface constituted either by the multi-hole array or by the annular reflector of FIG. 5. As mentioned above, the desired standing wave can be established by monitoring the sound levels with aid of a hydrophone probe.

The droplets however produced are contacted by the gas flow which is arranged to interact with the droplets in the manner described in more detail in connection with FIG. 6, the gas flowing from the inlet 12 to an outlet 34. In the absence of gas flow, it has been established that, because of the previously described slip streaming effect, there is a tendency for the droplets created by jet break-up to coalesce, especially within about 100 to 300 mm of the jet breakup point, with the result that the size distribution is adversely affected. By contacting the droplets with the gas stream in a suitable manner, a substantial fraction of the droplets can be prevented from undergoing coalescence and, in this way, it is possible to obtain a powder product comprising substantially monosize particles.

Conversion of the liquid droplets into powders may be effected in a variety of ways. A particularly convenient method involves making use of the gas used to entrain the droplets and maintain them separated in flight. Thus, for example, depending on the nature of the liquid formulation, the gas may be heated or cooled in order to transfer heat to, or extract heat from, the droplets. However, as mentioned previously other mechanisms for securing solidification (or partial solidification) are not excluded. The gas employed will usually be air although other gases are not excluded and may be necessary for example where it is necessary or desirable to prevent oxidation or where the gas effects solidification by means of chemical reaction with the droplets.

Whichever mechanism is employed to effect solidification, the liquid droplets follow a trajectory under the influence of the gas flow and undergo at least partial solidification while in flight and eventually deposit as a powder in the hopper section 14 of the main vessel 10. Powder can then be removed continuously or batchwise via the outlet 16.

Typically, the liquid formulation used has a density of 700 to 1500 kg $m^3$, a viscosity of $10^{-3}$ to $10^{-1}$ Pa.s and surface tension in air of 0.030 to 0.073N m. The orifice diameters are usually such that the droplets produced have a median diameter somewhat less than 1 mm, typical orifice diameters ranging from 10 to 500 microns giving typical pressure drops of 10 to 0.5 bar G and jet velocities of 3 to 20 m sec$^{-1}$ with Jet Reynold's numbers of 1 to $10^4$. The transducer operates with frequencies of 1 to 200 kHz with typical amplitudes of 0.5 to 5 microns. The gas stream velocity is typically 5 to 30 m sec$^{-1}$ giving gas Reynold's numbers of $10^5$ to $10^6$.

Figure 6:
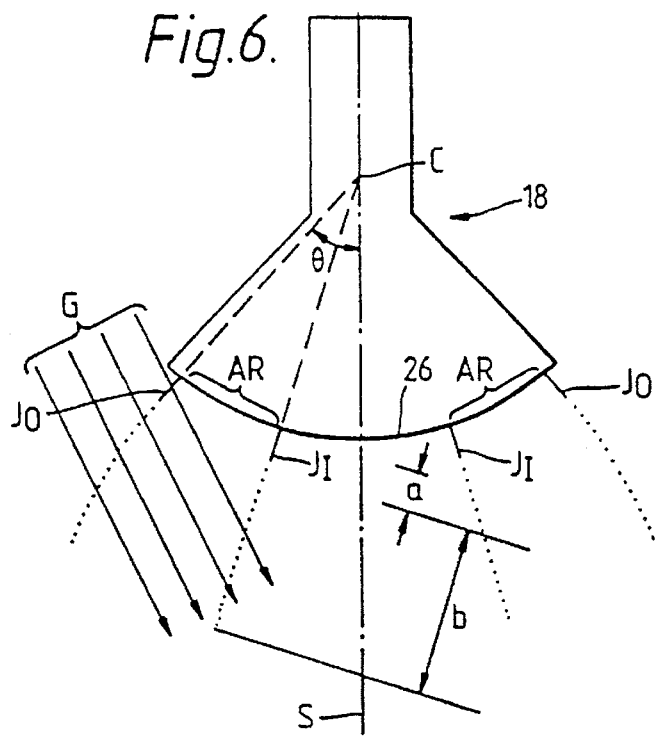
Figure 7A:
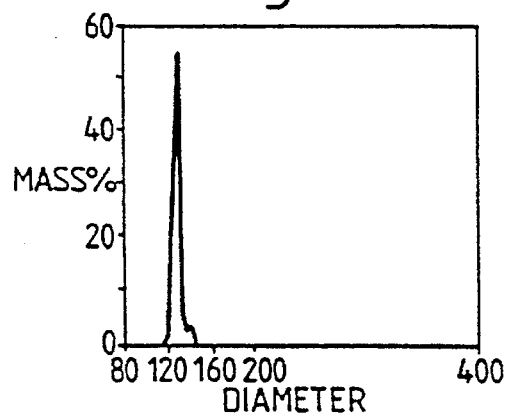
Figure 7C:
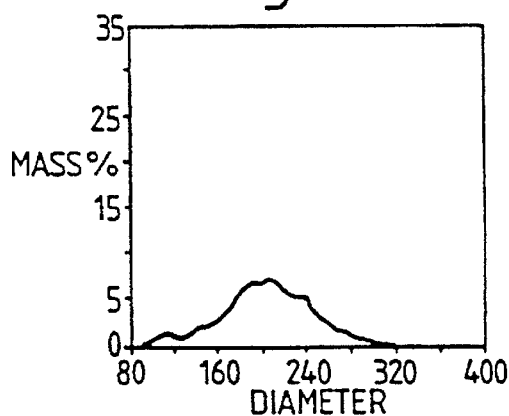
Figure 7B:
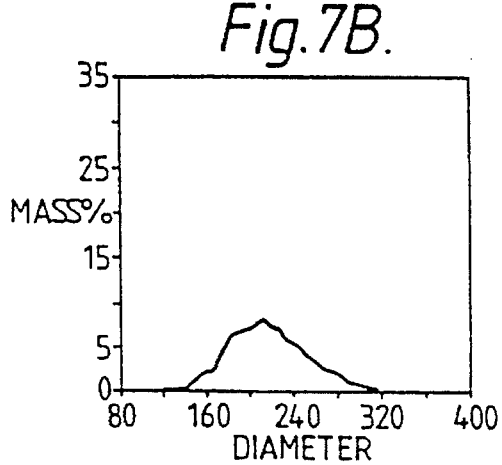
Figure 7D:
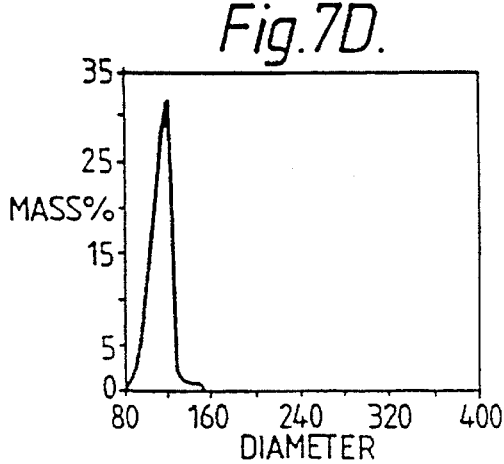

Referring now to FIG. 6, this illustrates certain considerations that arise in the design of a jet-producing device such as that shown in the embodiment of FIG. 1. The central region of the plate 26 is free of jet-producing orifices, jet production being confined to the annular region indicated by reference AR. The jets produced at the inner and outer extremities of the annular region AR are designated $J_I$ and $J_O$ and the jets which exist between these extremities have been omitted for clarity. The gas flow is designated by arrows G and, although shown at one side only, it will be appreciated that the gas stream G is directed inwardly towards the axis of symmetry S of the plate 26 around the entire outer periphery of the device 18. Point C represents the centre of curvature of the plate 26 and all of the jets have axes which, when extrapolated, intersect at point C.

The liquid initially issues from the orifices as continuous ligaments which subseqently break up into respective streams of droplets under the influence of the acoustic-pulsing applied via the body of liquid within the device. Dimension a represents the distance travelled by each jet before break up commences. Dimension b represents the distance travelled by each droplet stream between the point of jet break up and the onset of coalescence (in the absence of the gas stream G). Whilst the dimensions a and b will vary for different liquids and operating conditions (eg orifice diameter, jet velocity etc), typically the dimension a is of the order of 50 mm and the dimension b is 100 to 300 mm. The gas flow G is arranged so that it will impinge on the inner row of jets $J_I$ within the dimension b, ie before the onset of coalescence.

The gas stream G serves to reduce coalescence by one or both of two mechanisms. One mechanism involves disruption of droplet slip streaming by subjecting the droplets to a lateral force; for this, the gas stream is conveniently turbulent so that the lateral force is variable. A second mechanism involves acceleration of the droplets in each stream by the gas stream at least to such an extent that the spacing between successive droplets is not allowed to decrease to a point where coalescence can occur on a significant scale. In practice, the acceleration is usually such that the droplet spacing increases as a result of the acceleration imparted by the gas stream G. Although the gas stream G may be directed to secure one or the other of these mechanisms, in the preferred arrangement the gas stream is arranged so that both mechanisms are effective while at the same time ensuring that the gas stream impinges on all of the droplet streams before the onset of coalescence. It will be understood that this can be readily implemented in practice by appropriately angling the direction of the gas stream G, imparting a velocity to the gas stream so that the desired acceleration is obtained and by appropriately limiting the distribution of the jet producing orifices in the radially inwards direction. In the latter context, it will be understood that the closer the orifices are to the centre of the plate 26, the further the droplet streams will travel before they are contacted by the gas stream with the consequence that the gas stream is less effective (if at all) in reducing or preventing coalescence.

Typically the orifices will be distributed over a generally annular region AR such that the angles of inclination θ of the inner and outer jets $J_I$ and $J_O$ to the axis S lie between 30° and 60°.

To assist better understanding of the invention, reference is now made to FIGS. 7A to 7D which illustrate the effect of-the gas stream interaction with the droplet stream. FIG. 7A illustrates the size distribution obtained from a single acoustically pulsed jet issuing from a 50 micron orifice with a jet velocity of 6 m sec$^{-1}$, the liquid formulation being glycerol/water (viscosity 10 cP) subjected to a pressure of 4 Bar. In this case, there is no disruptive/accelerating gas flow. The size distribution was measured at a distance of 15 mm from the orifice. The SMD (Sauter mean diameter) was found to be 125 microns and it will be seen that a narrow size distribution exists at that location.

FIGS. 7B and 7C relate to the same set of parameters as referred to above except that the size distribution was measured at locations 150 and 215 mm respectively from the orifice. In these instances, it will be seen that the initially obtained narrow size distribution has broadened considerably and the SMD has increased substantially to 211 and 225 microns respectively.

FIG. 7D again relates to the same set of parameters as described in connection with FIG. 7A except that the jet in this case was projected into a gas stream having a flow rate of 150 liter hour$^{-1}$ (about 40 m sec$^{-1}$) and the size distribution was measured at a distance of 215 mm from the orifice. It will noted that, whilst the size distribution has broadened slightly, it remains narrow (the SMD in this case being measured as 113 microns).

As mentioned previously, it is preferred to operate the droplet generating device using standing wave conditions with the array of orifices located at a distance corresponding to an even number of wavelengths from the acoustic wave producing transducer. For a given orifice diameter and jet velocity, this distance can be determined by computing the optimal break up frequency (the so-called Weber frequency) $f_w$ given by:

$$f_w = u_j / l_v$$

where $u_j$ is the jet velocity (m/s) and $l_v$ is the wavelength of the fastest growing wave disturbance leading to jet break up, given by:

$$l_v = \pi D_j \sqrt{2}[1+3z]^{1/2}$$

where z is the Onhesore number, $z = n/(sdD_j)^{1/2}$ and where $D_j$ is the orifice diameter/jet diameter (m);

n is the viscosity of the liquid (Ns/m$^2$);

s is the surface tension of the liquid (N/m); and d is the density of the liquid (kg/m$^3$).

Using water for example (s=0.072 N/m, d=1000 kg/m$^3$, n=0.001 Ns/m$^2$), for a laminar jet velocity of 7 m/set and orifice diameter of 200 micron, the Weber frequency $f_w$ is 5520 Hz.

If $l_s$ and c are respectively the wavelength and speed for sound in water, then $$l_s = c/f_w = 1450/5520 = 0.262 \text{ meters.}$$

Thus, to obtain standing wave conditions, the orifice array needs to be located at a plate to transducer separation corresponding to $ml_s/4$ where m is an even integer. The strongest and least attenuated signal will be obtained when m=2, ie a plate to transducer separation of 0.131 meters.

The invention will be illustrated further by the following Examples.

EXAMPLE 1

A dispersing agent dissolved in water was subjected to controlled jet break up using a droplet producing device similar to that shown in FIG. 4. The dispersing agent solution was one which when formed into droplets could be dried by contact with hot air and had the following physical properties at 20° C.:

| Surface tension | 0.063 N/m |
|---|---|
| Density | 1217 kg/m³ |
| Viscosity | 0.014 Ns/m |

The orifice diameter was 200 micron and the laminar jet velocity (produced by controlling the liquid supply pressure) was set at 7.1 m/sec. The corresponding Weber frequency was computed, by the procedure described above, to be approximately 6930 Hz and the plate to transducer separation was set accordingly (m=2) to obtain standing wave conditions.

When the droplet streams were subjected to a turbulent, accelerating gas field having a velocity of 19.5 m/s (measured in the vertical direction) and directed so as to impinge on the droplets prior to the onset of coalescence, the droplet size distribution as measured at a location spaced vertically 860 mm beneath the orifice plate was found to narrow significantly giving a Sauter Mean Diameter of 450 micron with a standard deviation of 81 micron.

COMPARATIVE EXAMPLE 1

The above example was repeated using the same liquid formulation and conditions as specified above except that the laminar jet velocity was 6.6 m/s (the corresponding Weber frequency being computed as 6410 Hz) and the gas flow was absent. The orifice place to transducer separation was set accordingly to obtain standing wave conditions (m=2). Measurements of droplet size distribution made at a location spaced vertically 860 mm beneath the orifice plate was found to show the effect massive coalescence, the SMD in this case being 718 micron with a standard deviation of 288 micron.

EXAMPLE 2

The liquid formulation referred to in Example 1 above was converted to powder particles in an industrial scale spray drying tower of the form shown in FIG. 1. The droplet generator comprised a part-spherical plate formed with about 500 orifices arranged in a number of concentric rows with an orifice-to-orifice pitch of 5 mm and a row-to-row pitch of 5 mm. The outer row was located at a perpendicular distance of 140 mm from the vertical axis of symmetry of the part-spherical plate. Gas at a flow rate of 3.3N m³ s⁻¹ (at 20° C.) was heated to a temperature of 320° C. and introduced into the tower via an annular duct encircling the droplet generator such that the Reynolds number of the hot gas as it exited the duct was $2\times10^5$ (at 320° C.). The duct was oriented so that gas was directed radially inwardly at an angle of about 30° to the vertical.

Liquid was supplied to the droplet generator at a rate which resulted in the production of laminar jets having an exit velocity of 6.6 m s⁻¹. The jets issued from the part-spherical plate at angles which, relative to the vertical, ranged from 45° in the case of the outer row of jets to 30° in the case of the inner row of jets.

The transducer was positioned to set up standing wave conditions (m=2) and operated in accordance with a computed Weber frequency of 7470 Hz. The resulting particle size distribution as sized on a Fritsch particle sizer is given below:

| CLASS (micron) | Weight % in each class |
|---|---|
| 100–200 | 4 |
| 200–300 | 31 |
| 300–400 | 45 |
| 400–500 | 11 |
| 500–600 | 5 |
| 600–700 | 4 |

The mean particle size (based on mass) was found to be approximately 344 micron.

We claim:

1. A process for the production of solid particles, comprising: projecting from a body of liquid an array of mutually divergent jets; disturbing the jets to cause break up thereof into streams of droplets of narrow size distribution; contacting the array of resulting droplet streams with a gas flow which has a magnitude exceeding the magnitude of the velocity at which the jets are projected to reduce coalescence of the droplets in each stream; and causing or allowing the droplets to solidify at least partially while in flight.

2. A process as claimed in claim 1 in which solidification of the droplets is effected by interaction with the gas.

3. A process as claimed in any one of claims 1 or 2 further comprising projecting the liquid as a plurality of jets while applying pressure pulses to said body of liquid formulation so that the jets are simultaneously subjected to said pressure pulses and are thereby caused to break up into droplets of narrow size distribution.

4. A process as claimed in any one of claims 1 or 3 in which the liquid is projected as a multiplicity of mutually-divergent jets from a curvilinear surface, the jets being encompassed between a pair of imaginary conical surfaces which intersect the curvilinear surface.

5. Apparatus for producing solid particles, comprising: means for discharging liquid formulation from a body of the liquid as an array of jets; means for disturbing the jets to cause break up thereof into an array of droplet streams comprising droplets having a narrow size distribution; means for contacting the droplet streams with a gas flow which has a magnitude exceeding the magnitude of the velocity at which the jets are projected so that, prior to the onset of coalescence, the droplets in each stream are dispersed to reduce coalescence thereof; and means for effecting at least partial solidification of the droplets while in flight.

6. Apparatus as claimed in claim 5 in which said disturbing means is operable to apply pressure pulses to said body of liquid so as to disturb the jets simultaneously and effect break up thereof into droplets having a narrow size distribution.

7. Apparatus as claimed in claim 6 in which the pressure pulses are produced by an acoustic transducer immersed within or in contact with the body of said liquid formulation.

8. Apparatus as claimed in claim 7 in which the pulse frequency is that at which the jets resonate.

9. Apparatus as claimed in claim 7 or 8 in which said discharging means comprises a plate defining an array of orifices from which the liquid is discharged and in which the distance of separation between the plate and the active surface of the transducer substantially corresponds to an even number of quarter wavelengths of the acoustic waves generated within the body of liquid.

10. Apparatus as claimed in any one of claims 5 to 8 in which the jets are projected from an array of orifices formed in a curvilinear outwardly convex surface such that the curvature of the surface determines the trajectories of the jets.

11. Apparatus as claimed in any one of claims 6 to 8 in which the pulsing means is so designed as to produce a pressure wave having a wavefront which substantially conforms to the shape of the surface in which the orifices are formed.

12. Apparatus as claimed in any of claims 5 to 9 in which contact between the droplets and said gas flow is such that the droplets are subjected to variable displacement forces laterally of the direction of jet projection and/or to an acceleration in the general direction of travel of the array of jets.

13. A method of spray drying a liquid formulation to produce a particulate product, comprising:

(a) projecting the liquid formulation from a vessel containing the same as an array of downwardly directed jets;

(b) generating acoustic waves within the liquid contained by the vessel in such a way as to disturb the jets substantially simultaneously to cause them to break up into streams of droplets having a narrow size range;

(c) prior to the onset of droplet coalescence, contacting said streams of droplets with a turbulent gas flow to reduce droplet coalescence; and (d) as the liquid droplets descend within the tower, effecting at least partial solidification of the liquid droplets by interaction with said gas.

14. A method as claimed in claim 13 in which the gas flow is such that the droplets are subjected by said gas flow to variable displacement forces laterally of the direction of jet projection.

15. A method as claimed in claim 13 or 14 in which the droplets are subjected by said gas flow to acceleration in the general direction of travel of the array of jets.

16. A method as claimed in any one of claims 1 to 3 and 14 to 15 in which the gas is introduced via an annular passageway encircling a perforated plate from which the droplets projected, the gas flow being directed inwardly relative to the array of jets so as to intercept the droplet streams prior to the onset of coalescence.

17. A method as claimed in any one of claims 1 to 3 and 14 to 15 in which the liquid formulation is projected through orifices in a plate of generally spherical configuration and in which the acoustic waves are generated in such a way that the wavefront generally conforms to the configuration of the plate, the frequency substantially corresponds to the resonant frequency of the jets and substantially standing wave conditions prevail between said plate and the active face of the transducer generating the acoustic waves.

18. Spray drying apparatus for producing solid particles, comprising:

(a) a tower;

(b) means located at an upper portion of the tower for discharging liquid formulation from a vessel containing the same as an array of downwardly directed jets of predetermined velocity and diameter;

(c) means for disturbing the jets to cause break up thereof into an array of droplet streams comprising droplets having a narrow size distribution;

(d) means for introducing a gas flow into the tower with a velocity of magnitude in excess of that of the jets and in such a way that the gas contacts the droplet streams prior to the onset of coalescence, thereby dispersing the droplets in each stream to reduce coalescence thereof; and (e) means for effecting at least partial solidification of the droplets as they descend within the tower.

19. Apparatus as claimed in claim 18 in which said means for effecting at least partial solidification of the droplets is constituted by said means for introducing the gas flow into the tower.

20. Apparatus as claimed in claim 18 or 19 in which said discharging means comprises a perforated plate of generally part-spherical configuration through the orifices of which the liquid is discharged, said disturbing means comprises an electroacoustic transducer having an active face which is in contact with the liquid contained by the vessel and is of complementary configuration to the plate, the transducer is operated at a frequency substantially corresponding to the resonant frequency (Weber frequency) of the jets, and the transducer and said plate are so spaced that acoustic standing wave conditions are set up within the liquid contained by the vessel.

21. A process for the production of solid particles, comprising: projecting from a body of liquid an array of mutually divergent jets while applying pressure pulses to said body of liquid formulation so that the jets are simultaneously subjected to said pressure pulses and are thereby caused to break up into droplets of narrow size distribution; contacting the array of resulting droplet streams with a gas flow to reduce coalescence of the droplets in each stream; and causing or allowing the droplets to solidify at least partially while in flight.

22. A process for the production of solid particles, comprising: projecting from a body of liquid an array of mutually divergent jets from a curvilinear surface, the jets being encompassed between a pair of imaginary conical surfaces which intersect the curvilinear surface; disturbing the jets to cause break up thereof into streams of droplets of narrow size distribution; contacting the array of resulting droplet streams with a gas flow to reduce coalescence of the droplets in each stream; and causing or allowing the droplets to solidify at least partially while in flight.

* * * * *